United States Patent [19]

Slettebak

[11] Patent Number: 4,881,702

[45] Date of Patent: Nov. 21, 1989

[54] READILY CONVERTIBLE AIRCRAFT PASSENGER SEATS

[75] Inventor: Richard J. Slettebak, Kirkland, Wash.

[73] Assignee: The Boeing Company, Seattle, Wash.

[21] Appl. No.: 139,282

[22] Filed: Dec. 29, 1987

[51] Int. Cl.⁴ ............................................. A47C 15/00
[52] U.S. Cl. .................................. 244/118.6; 297/232; 297/257
[58] Field of Search ..................... 244/118.6; 297/118, 297/130, 232, 257

[56] References Cited

U.S. PATENT DOCUMENTS

| | | | |
|---|---|---|---|
| 3,374,032 | 3/1968 | Del Giudice | 297/394 |
| 3,480,240 | 11/1969 | Del Giudice | 244/118 |
| 3,637,253 | 1/1972 | Maule et al. | 296/65 R |
| 3,743,351 | 7/1973 | Harris | 297/107 |
| 3,877,747 | 4/1975 | Brennan et al. | 297/124 |
| 3,893,729 | 7/1975 | Sherman et al. | 297/118 |
| 3,910,632 | 10/1975 | Marechal | 297/232 |
| 4,489,978 | 12/1984 | Brennan | 297/232 |
| 4,533,175 | 8/1985 | Brennan | 297/232 |
| 4,705,274 | 11/1987 | Lubeck | 297/332 |

*Primary Examiner*—Sherman D. Basinger
*Assistant Examiner*—Stephen P. Avila
*Attorney, Agent, or Firm*—Delbert J. Barnard; Eugene O. Heberer

[57] ABSTRACT

Aircraft passenger seat frames (60, 62, 220, 222 and 224) having legs (54, 56, 210, 212) fixed in place in the aircraft and with the seat frames. Each seat frame has generally horizontal supporting members (66, 68, 74, 76) having their opposite ends secured in seat end webs (70, 72, 78, 80). Tubes (84, 86) are associated with each of the seat end webs of the plurality of seat frames in a supporting relationship, the legs (54, 56) being connected to the tubes to support the seat frames. The tubes have a tube-in-tube slip joint (88, 90) at least at one outside end of the one seat frame on which the seat can be moved toward or away from an adjacent seat frame to change the fare class size of the set frames.

25 Claims, 11 Drawing Sheets

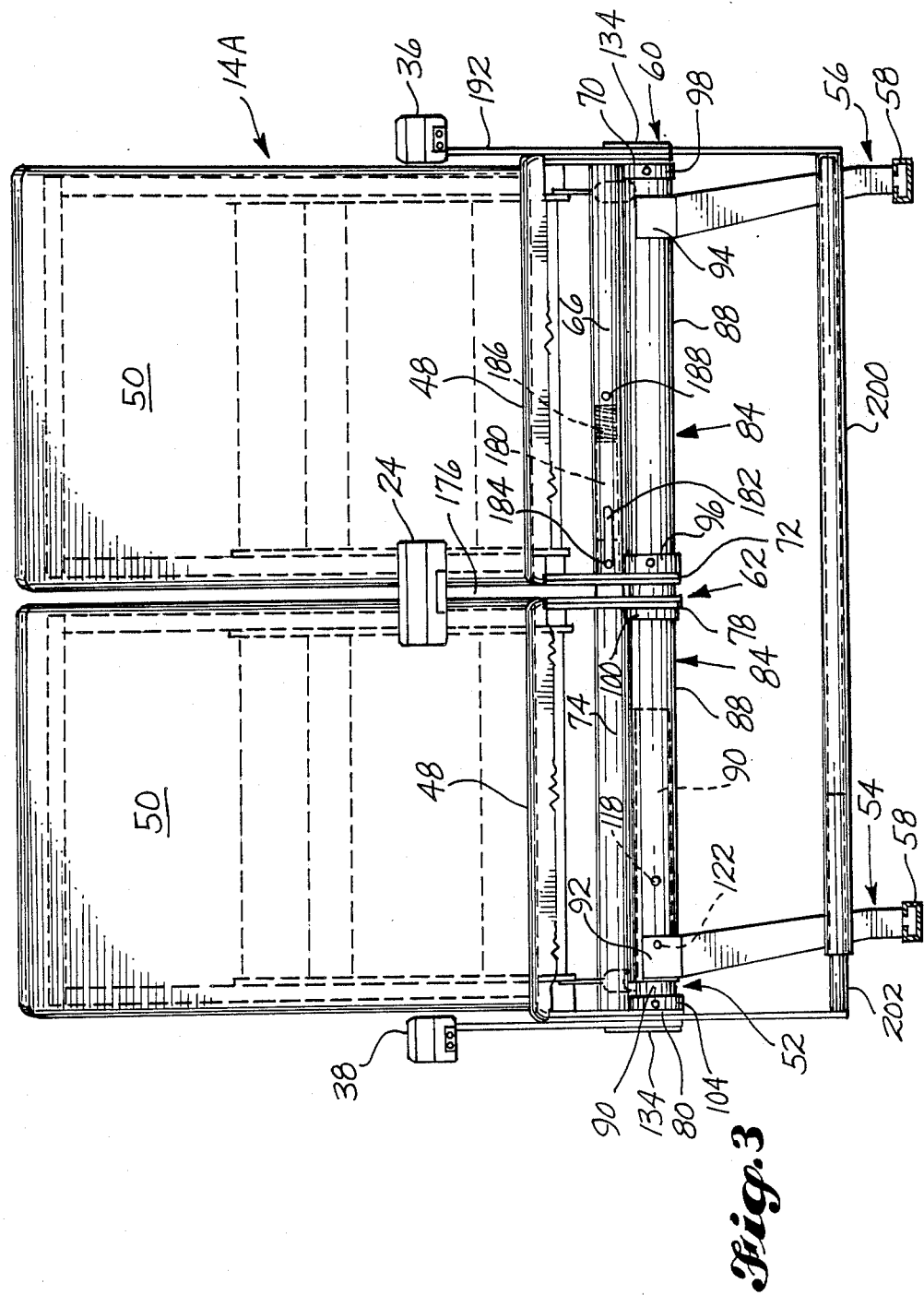

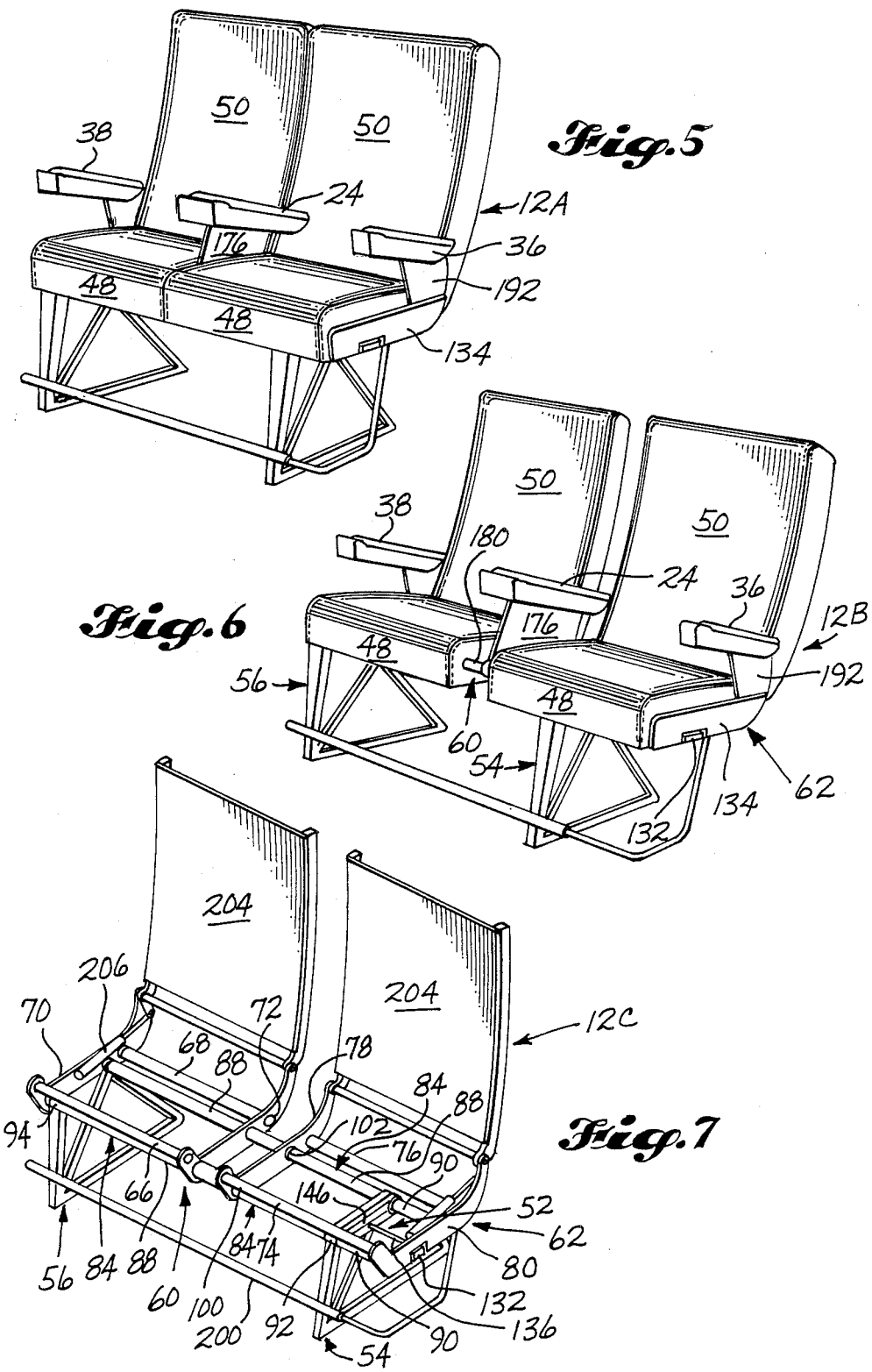

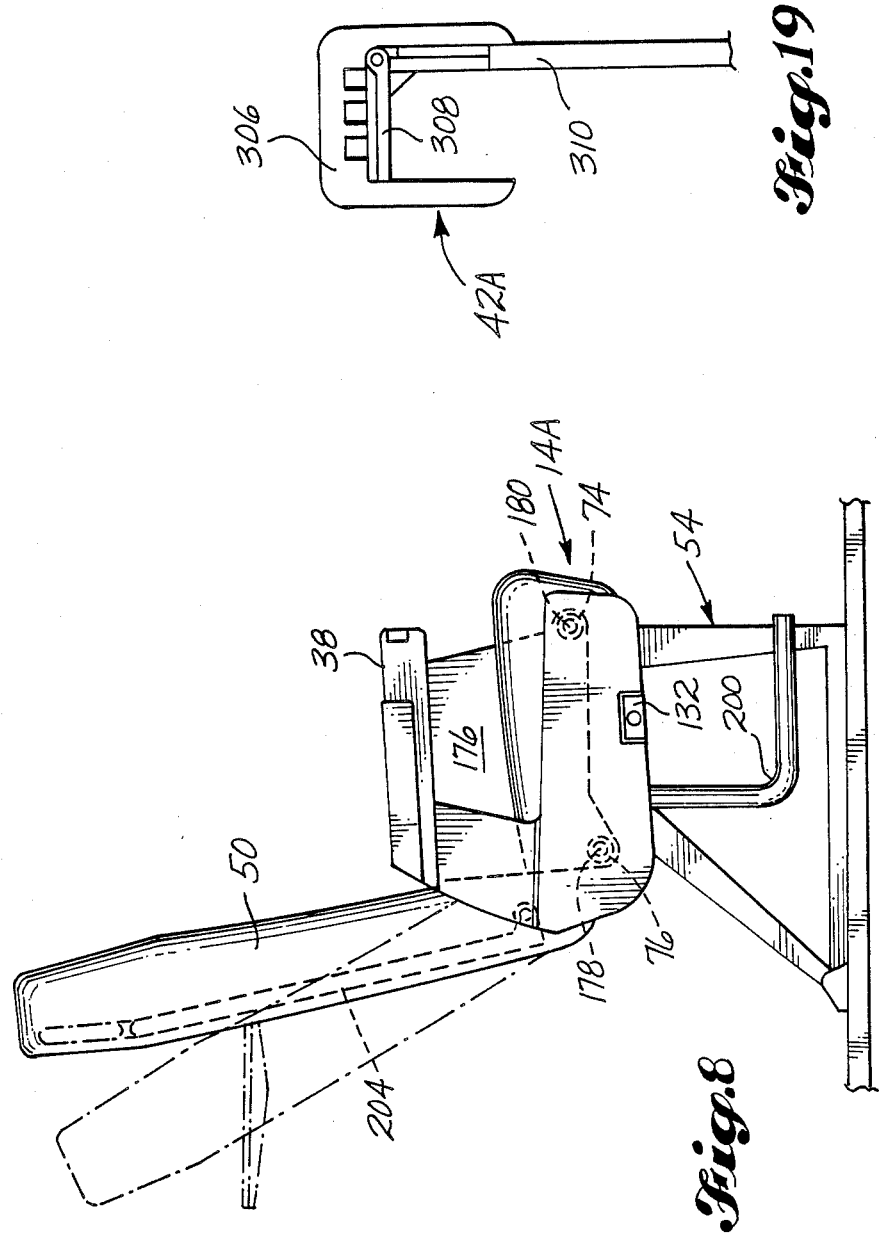

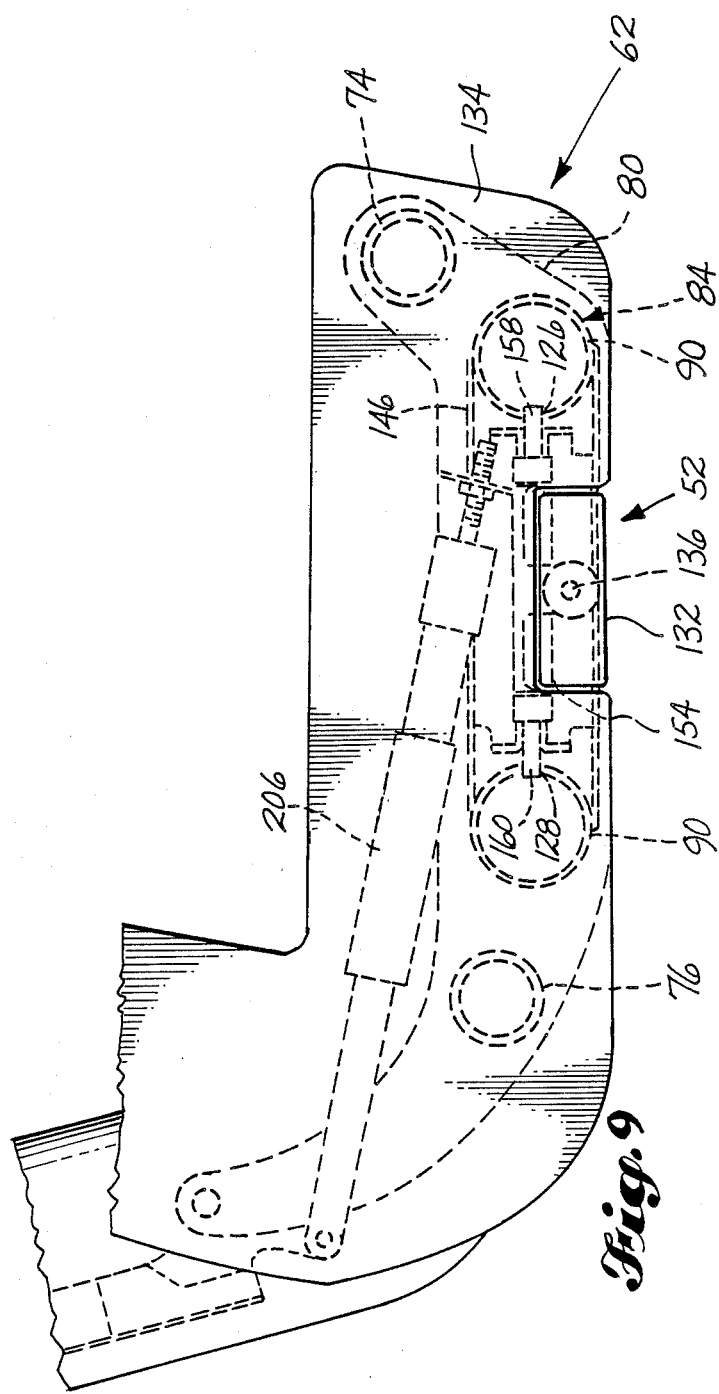

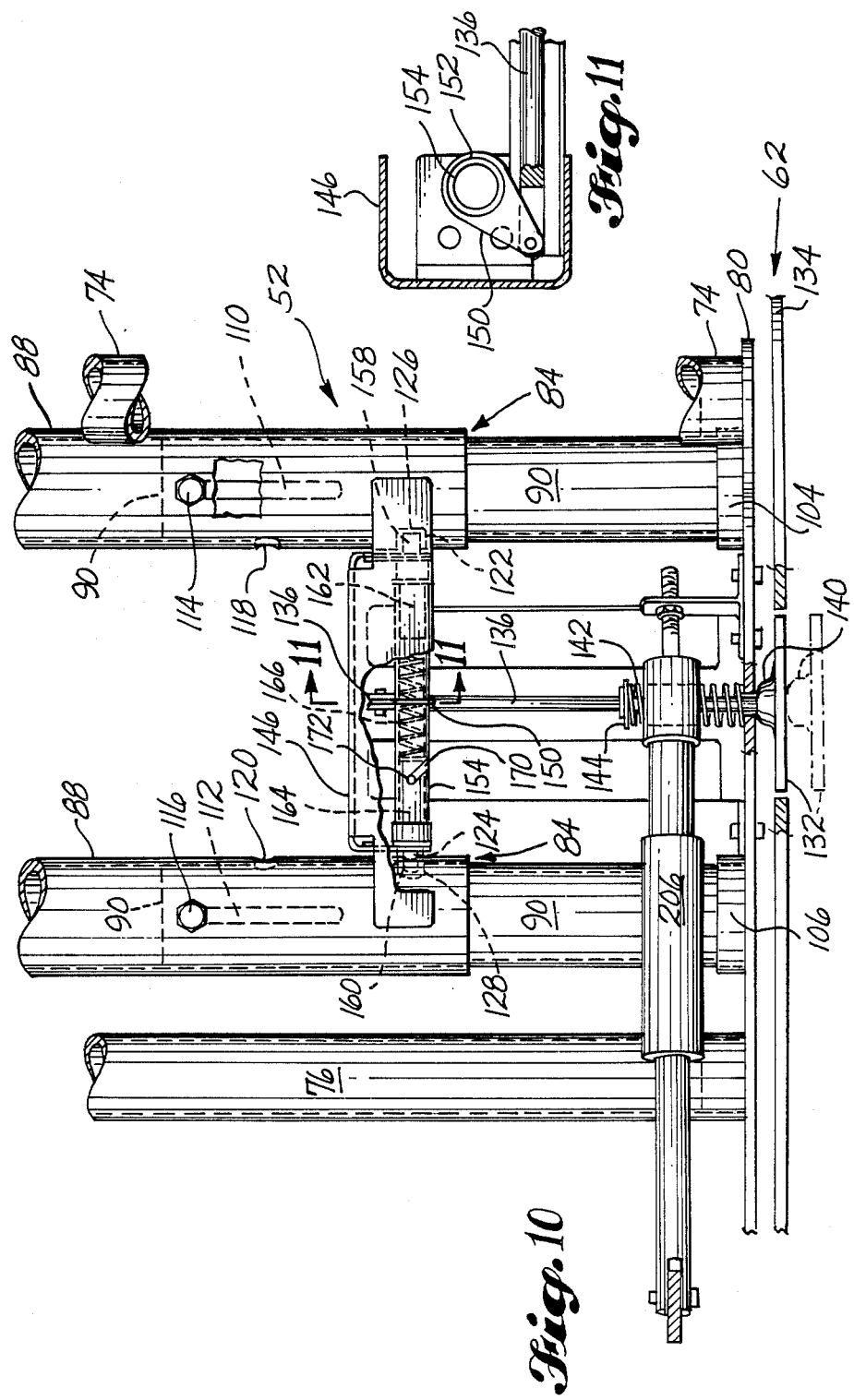

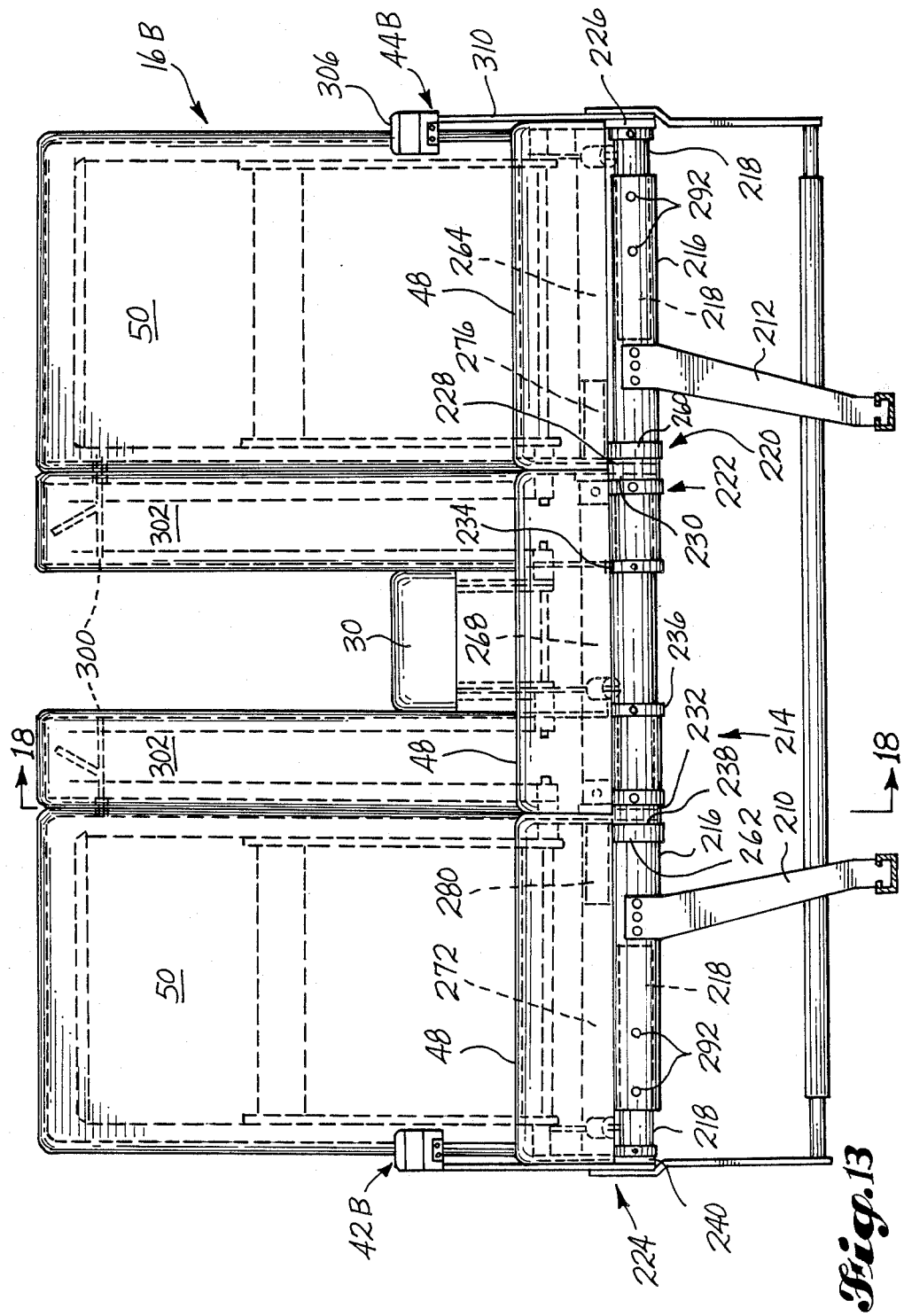

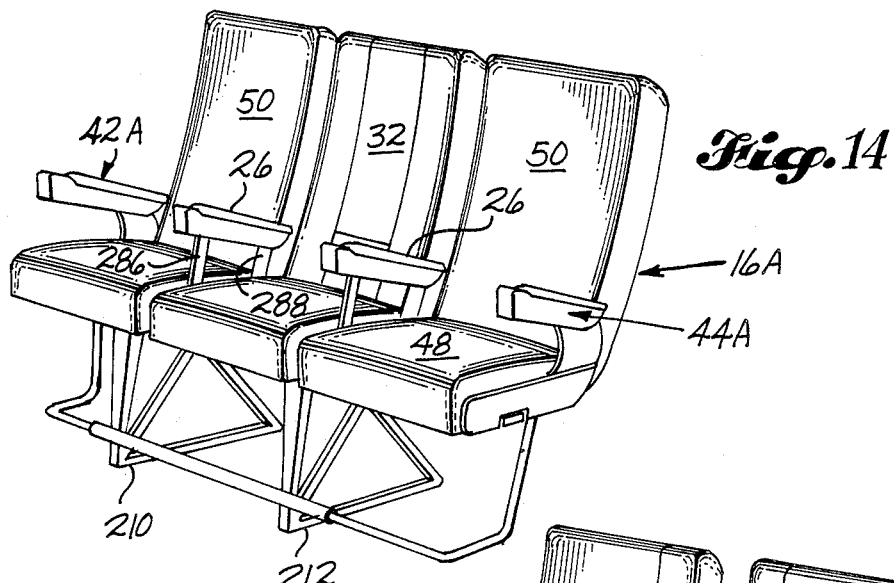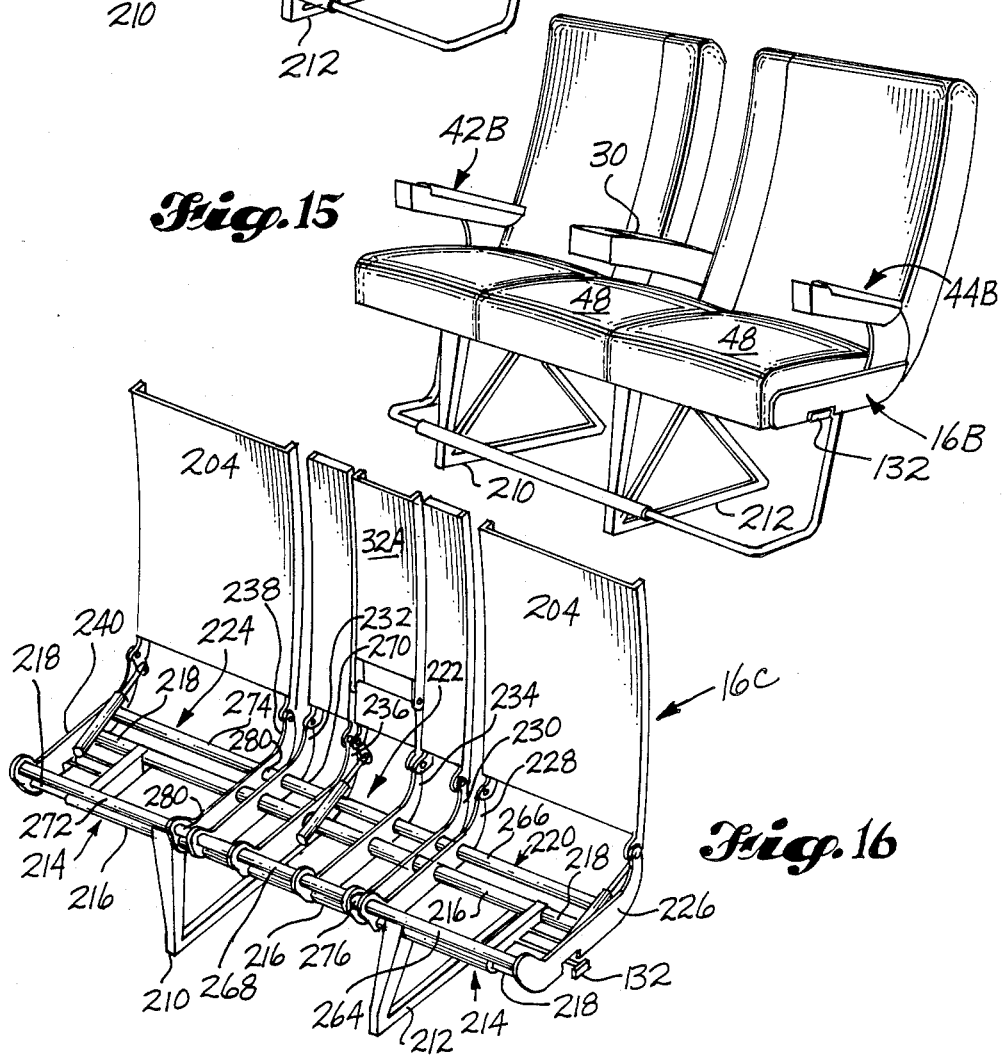

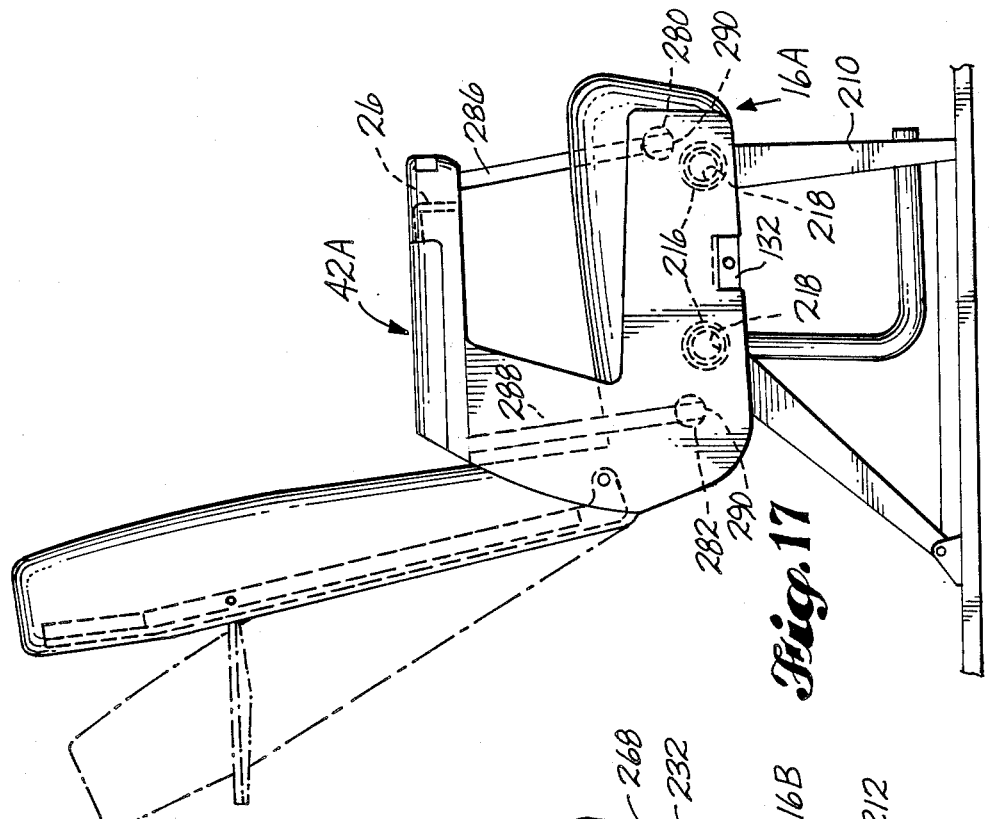
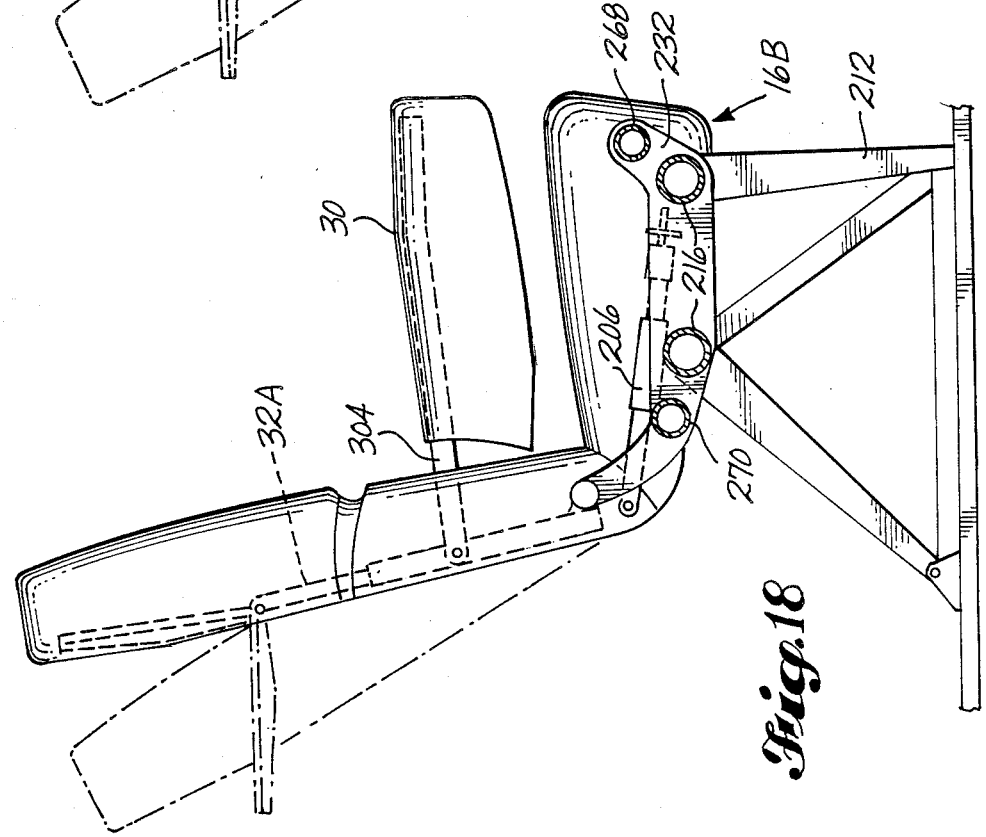

READILY CONVERTIBLE AIRCRAFT PASSENGER SEATS

DESCRIPTION

1. Technical Field

The invention relates to easily convertible passenger seating arrangements whereby tourist class seats may be converted to business class seats, and vice versa, as needed depending upon the specific passenger mix make-up for an individual flight.

2. Background Art

In the prior art aircraft passenger seats have been converted to different fare class sizes making substantial changes in the seats, including adding parts, and/or removing the entire seats and replacing them with seats of different sizes. Such changes required excessive time and usually could not be made by the flight crew.

In the present flight operations there is a need to frequently change tourist class seats and business class seats. This type of change has been accomplished physically by removing one class and installing the other, usually during overnight maintenance. Such a lengthy change requirement is not practical in present flying operations.

A search of the patent literature discloses a number of seating arrangements. For example, U.S. Pat. No. 3,893,729 to Sherman et al. illustrates aircraft seats variable in width to allow for either coach or first class accommodations. The seat bottoms are extendible and when extension occurs, a short segment of cushion is added, an armrest cap folds open, and a center table is plugged into bayonet sockets in the armrest.

The following other patents found in the search disclose other seating arrangements:

| U.S. Pat. No. | Inventor |
| --- | --- |
| 3,374,032 | F. J. Del Giudice |
| 3,480,240 | F. J. Del Giudice |
| 3,637,253 | Maule et al. |
| 3,743,351 | Harris |
| 3,877,747 | Brennan et al. |
| 3,910,632 | Marechal |
| 4,533,175 | Brennan |

DISCLOSURE OF THE INVENTION

The invention includes an arrangement for a row of seats in which there are two outboard double seats and center triple seats. Thus, the foregoing seven seats in a row are used as a tourist configuration and may be changed in place by members of the crew to six business configuration seats without removing or adding parts to the airplane.

The invention includes in each plurality of juxtaposed seat frames legs that are fixed in place and each seat frame has generally horizontal supporting members having their opposite ends secured in seat frame end webs. Tubes are associated with each of the seat end webs of the plurality of seat frames in a supporting relationship and the legs are connected to the tubes to support the seat frames. The tubes have a tube-in-tube slip joint at least at one outside or aisle end of one seat frame on which the seat frame can be moved toward or away from an adjacent seat frame to change the fare class size of the seats.

Each tube-in-tube slip joint has an inner small diameter tube and an outer large diameter tube, the inner and outer tubes being in slidable engagements. Each inner tube is in connective support with a seat end web at an outside or aisle end of the one seat frame and each outer tube is in relative slidable supportive engagement in an inner web of the one seat frame opposite the outer or aisle web. The inner web of the one seat frame has collars attached thereto and in which the outer tubes are in slidable supportive engagement.

There is a locking and releasing mechanism at the one end of the one seat frame to lock and release the inner and outer tubes with respect to each other.

In the two seat arrangement there is a translatable armrest fitted between the two seat frames and it is translatable to be closely adjacent to both seat frames when a seat frame has been moved toward the other seat frame as to be proximate thereto. The armrest is translatable to be spaced between the two seat frames when one seat frame has been moved away from the other. There are means in the supporting members to maintain the translatable armrest to be spaced between the seats.

In the three seat combination, used as the center seats, the tubes have tube-in-tube slip joints at outside ends of the outside or two aisle seat frames. The aisle seat frames can be moved inwardly from a three seat combination to a two seat combination and outwardly from the two seat combination to a three seat combination.

In the three seat combination, the seat frames are spaced from each other to provide smaller seat, lower fare arrangements. Along side the inner of the three seats are armrests which are removable to permit the three seat combination to be changed to a two seat combination. When the two seat combination is formed by moving the aisle ends of the seat frames inwardly so that the cushions of the three seats are in contact, an inner seat armrest is provided as a part of the back of the inner seat and it is hinged so as to be movable downwardly to form a center armrest for the new two seat arrangement of center seats.

In the three seat combination, the two outer or aisle armrests extend outwardly of the seat but in the two seat combination they are arrangable to extend inwardly over the seats and to enlarge the aisle space.

Further advantages of the invention may be brought out in the following part of the specification wherein small details have been described for the competence of the disclosure, without intended to limit the scope of the invention which is set forth in the appended claims.

BRIEF DESCRIPTION OF THE DRAWINGS

Referring to the accompanying drawings which are for illustrative purposes:

FIG. 3 is a front elevational view of two tourist class seats and their frames;

FIG. 5 is a pictorial view of a combination of two tourist seats as shown in FIG. 3;

FIG. 6 is a pictorial view of a combination of two business class seats as shown in FIG. 4;

FIG. 7 is a pictorial schematic view of the seat frames of the seats shown in FIG. 6;

FIG. 8 is a side elevational view of the combination of two seats as shown in FIGS. 5 or 6.

FIG. 9 is a side elevational fragmentary detail view of a locking and release mechanism as used in converting the seats from one fare class to another;

FIG. 10 is a fragmentary plan view of the locking and releasing mechanism shown in FIG. 9;

FIG. 11 is a fragmentary view taken along the lines 11—11 in FIG. 10;

FIG. 13 is a front elevational view of the seats shown in FIG. 12 converted into two business class seats;

FIG. 14 is a pictorial view of three center tourist class seats as shown in FIG. 12;

FIG. 15 is a pictorial view of two centered business class seats as shown in FIG. 13;

FIG. 16 is is pictorial view of the seat frame details of the three centered sheets substantially as shown in FIG. 12;

FIG. 17 is a side elevational view of the seats as shown in FIG. 12;

FIG. 18 is a side elevational view of the inner seat, taken along lines 18—18 in FIG. 13; and FIG. 19 is a fragmentary view of the details of the outer armrest as shown in FIG. 12.

BEST MODE FOR CARRYING OUT THE INVENTION

Figure 2:
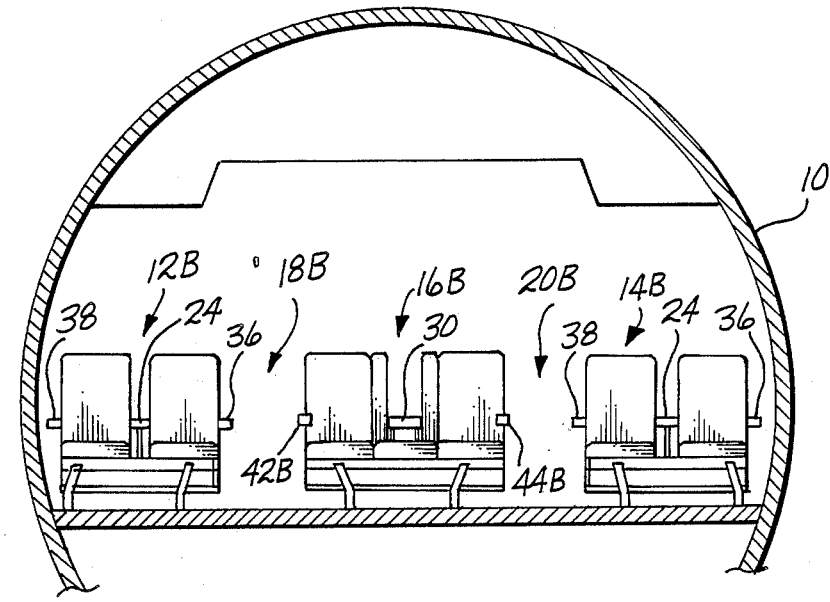
FIG. 2 is a front elevational view of a conversion of the tourist seats in FIG. 1 to business class seats in which there are two pairs of outer business class seats and a pair of centered business class seats spaced from the outer seats by two aisles.
Figure 1:
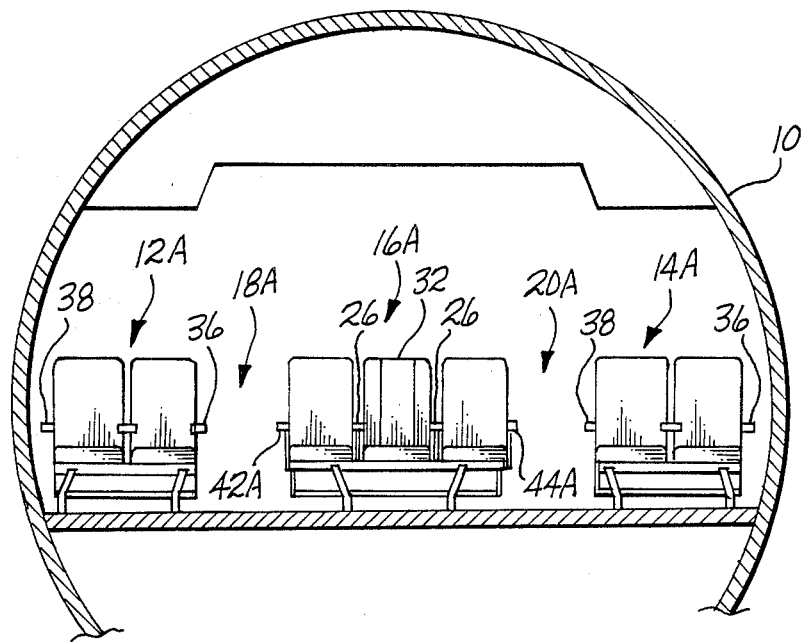
FIG. 1 is a front elevational view of a row of seven tourist class seats in an aircraft, there being two combinations of outer pairs of seats and a combination of three center seats spaced from the outer seats by two aisles.

Referring again to the drawings, there is shown in FIGS. 1 and 2 an aircraft body 10 in cross section having a row of aircraft passenger seats, convertible from tourist class to business class and vice versa.

In FIG. 1 there are seven seats comprised of two pairs of outer seats 12A and 14A and a combination of three center seats 16A, the outer seats being adjacent the aircraft sidewalls and spaced from the center seats by aisles 18A and 20A. These seats are in the form of low fare seats such as tourist class and each seat and back have the same widths.

In FIG. 2 the seats in FIG. 1 have been converted to a higher fare-type such as business class seats. Here the two pairs of outer seats 12B and 14B are the same size as those in FIGS. 1 but are spaced apart to provide more room outwardly of the center armrest 24. The combination of center seats 16B has been converted from three seats into two seats with the inner armrests 26, FIG. 1, removed and a center armrest 30 being provided by having a portion of the center back 32 being folded downwardly.

For example, in FIG. 1 the outer seats, measured from the outer ends of the armrests 36 and 38, occupy forty-three inches and the center seats measured from the outer ends of the armrests 42 and 44 occupy fifty-nine inches. In FIG. 2 the distance between the outer ends of the armrests 36 and 38 has been increased to forty-eight inches, and the center seats, having been reduced to two, the outer ends of the armrests having been reversed to extend over the aisle seats, have a distance of fifty-one inches therebetween. Thus, the pairs of outer seats have been increased by five inches in width and the two center seats in FIG. 2 have been reduced eight inches from the three center seat requirement to fifty-one inches. The aisles in FIG. 2 are one inch smaller in width than the aisles in FIG. 1.

Figure 4:
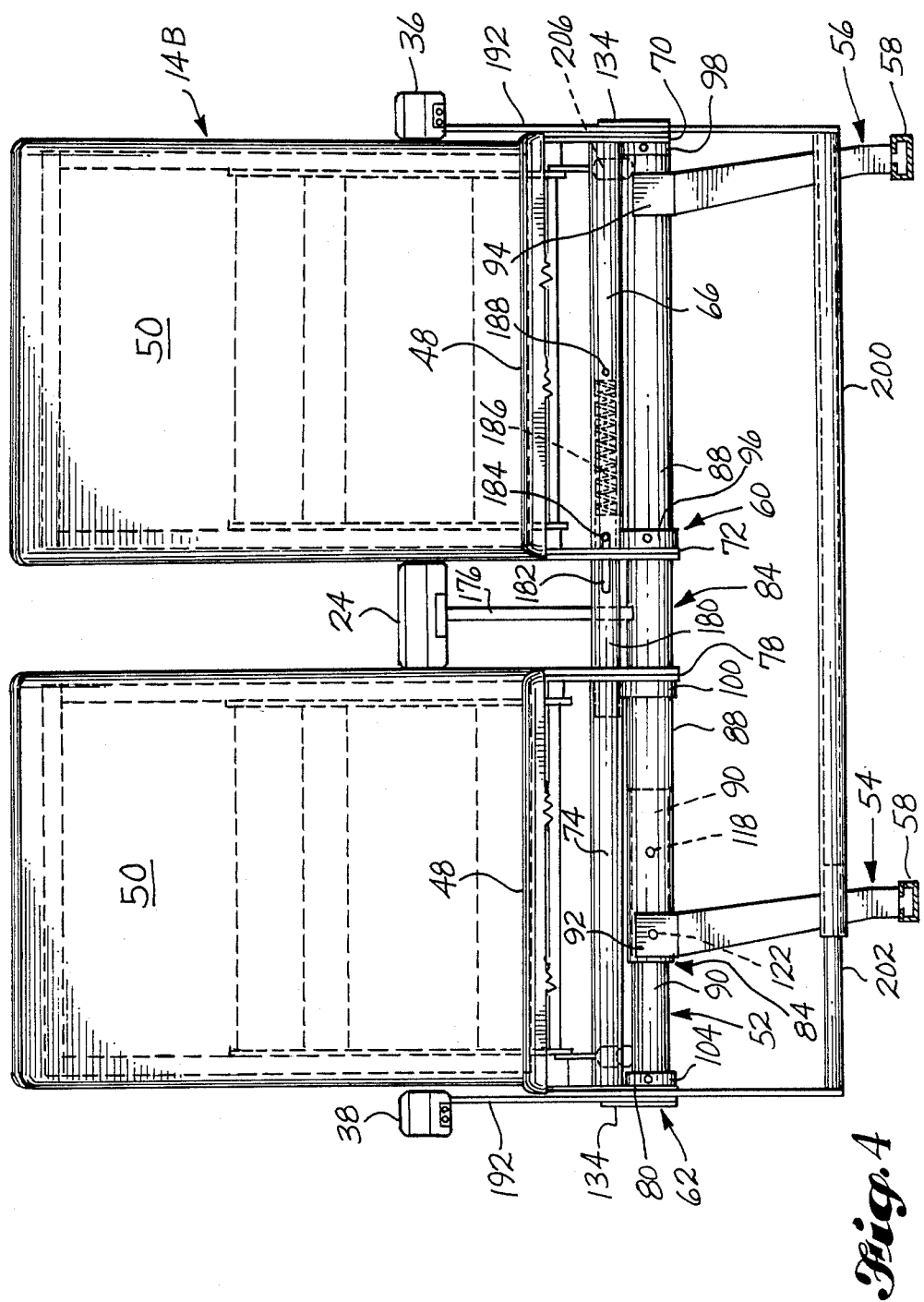
FIG. 4 is a front elevational view of the seats in FIG. 3 spaced apart to be in the form of business class seats.

In FIGS. 3-11 the outer seats in the form of 14A and 14B are shown in detail. The seats 14A and 12A are identical except that they are reversed in that they expand and are contracted toward and away from the aisles. All of the seat cushions 48 and the back cushions 50 are the same and move with the seat frames on which they are positioned and in which the conversion occurs. Each of the individual seats in combination form, as shown in FIGS. 3, 4 and 7 are substantially identical. The conversion mechanism, generally indicated as 52, is best seen in FIGS. 7, 9 and 11.

In FIGS. 5 and 6, outside combination seats 12A and 12B are shown in pictorial view destinct from the same combination shown in FIGS. 1 and 2. In FIG. 7 the seat frame combination 12C is shown in the expanded or extended form and illustrates the result of the frame movement as indicated in 12B in FIGS. 2, 4, and 6, the movement or extension having been toward the aisle 18B. The combination of seat frames as 12C are supported on two sets of legs 54 and 56, fixed in place with respect to the frames and fixed in place in tracks 58, FIGS. 3 and 4 in the aircraft.

The frames as 12C are comprised of a combination of a plurality of seat frames, generally designated as 60 and 62, the latter being an aisle frame. The combination of frames 60 and 62 thus supports two convertible seats.

Seat frame 60, FIGS. 3, 4, 6, and 7, has a pair of tubular horizontal supporting members 66 and 68 secured to inner and outer generally vertical seat webs 70 and 72, and in the same manner seat frame 62 has a pair of tubular generally horizontal supporting members 74 and 76 secured to inner and outer generally vertical end webs 78 and 80, also FIGS. 9 and 10. Associated with each of the end webs 70, 72, 78 and 80 are a pair of juxtaposed first tubes 84. The first tubes 84 are comprised of outer large diameter tubes 88 and inner small diameter tubes 90 to form tube-in-tube slip joints on which an outside end or aisle end of the seat frames may be moved toward or away from the juxtaposed seat frame to change the fare class size of the seats from tourist to business class and vice versa. The outer large diameter tubes 88 are fixed to the seat legs in a conventional manner at 92 and 94.

The outer large diameter tubes 88 are also secured to the seat frame 60 by means of collars 96 and 98 which are secured to end webs 72 and 70, FIGS. 3 and 4. Collars 100 and 102 are fixed to end web 78, FIG. 7. The end web 78 and the collars 100, 102 are slidably engaged with the large diameter tubes 88 so as to be able to slip over them. The collars 100, 102 on the web 78 provide additional support for the seat frame 62. Small diameter inner tubes 90 are secured to the end web 80, FIGS. 3, 4, and 10, and provide additional support in the collars 104 and 106 secured to the end web. Thus, the legs directly support the first tubes 84, comprised of the tubes 88 and 90, and in turn support the four end webs.

In FIGS. 7 and 9-11 the locking and releasing mechanism 52 is shown in detail. In the inner tubes 90 there are slots 110 and 112, and extending through the outer tubes and the slots are bolts 114 and 116, respectively, which limit the movement of the inner tubes in the outer tubes. As shown in FIG. 10, the inner tubes and the slots have been moved outwardly as far as possible, and when the inner tubes are moved inwardly to convert the seats to tourist class, the slots are moved so that their other ends abut the bolts 114 and 1126. On the inside of the outer tubes there are two cylindrical openings 118, 120, and 122 and 124 and each of the inner tubes has a cylindrical opening 126 and 128 which are adapted to mate with cylindrical openings in the outer tubes depending upon the position of the inner tubes with respect to the outer tubes.

The locking and release mechanism has a handle 132 which is normally fitted within a seat end plate 134 outwardly of the end web 80 and attached to the handle and extending inwardly therefrom is an actuating rod 136. Inwardly of the handle there is a generally cylindrical stop 140 to position the handle in place with the stop against the end web 80 where it is normally held by a coil spring 142, surrounding the rod 136 and adapted to abut the end web 80, having its other end abut a pin held washer 144.

The rod 136 extends into a housing 146 of the mechanism 52. As shown in FIG. 10 the housing 146 is supported by the outer tubes 88 and slides on these tubes when the configuration is changed. The inner end of the rod 136 is pivotally connected to a crank 150, having a cylindrical opening 152 so as to be secured around a cylinder 154 supported for rotation within the housing 146. Extending outwardly from the opposite ends of the cylinder are pins 158 and 160, adapted to extend into the cylindrical openings 118, 120, 122, 124, 126 and 128 in the inner and outer tubes. The pins extend outwardly from plugs 162 and 164 which are slidably engaged in and adjacent the opposite ends of the cylinder 154. In the space between the plugs is a coil spring 166 which holds the pins in their positions outwardly of the cylinder and in the holes to lock the seat frames in their retracted and extended positions. The cylinder 154 has two generally spirally directed slots 170, only one shown, radially outwardly of the plugs 164 and 162 and connected to the plugs extending into the slots are pins 172, one shown. When the handle 132 is pulled away from the seat, the rod 162, FIG. 11, is moved linearly to rotate the cylinder 154 counterclockwise to move the pins 172 downwardly in FIG. 10 so as to withdraw the pins 158, 160 from the inner and outer tubes. The seats then may be converted from one class to the other and in FIG. 4, the inner tubes 90 may be moved inwardly so as to retract the seats and change them into the tourist class. As the tubes are moved inwardly until the outer end of the slots 110 and 112 move into abutment with the bolts 114, 116, the pins 158, 160 will then be in register with the cylindrical holes 118 and 120 and the holes in the inner tubes. At this time the handle 132 will be moved inwardly so as to rotate the cylinder 154 to cause the pins 158 and 160 to enter the holes 118 and 120 in the outer tubes and the holes 126 and 128 in the inner tubes so as to lock the seat frames in the retracted position, as shown in FIG. 3. The spring 166 holds the pins in a locked position and the spring 142 holds the handle 132 in a locked position.

As shown in FIGS. 3-8, the center armrest 24 is supported on a plate 176 and adjacent its lower end it has two openings in which sleeves 178 and 180 extend. Sleeves 178 and 180 are slidably supported in the tubular supporting members 68, 76, and 66 and 74, respectively. Sleeves 180 and 178 have slots 182 and extending into the slots are pins 184 fitted in the supporting tubes 66 and 68. In the tubes 66 and 68, inwardly of the sleeves 178 and 180 are coil springs 186, only one shown, abutting the sleeves on their inner ends. Pins 188 extend through each of the tubes 66 and 68 to retain the springs.

As shown in FIG. 4, where the seat frames are in the extended position, the spring 186 is holding the sleeves 178 and 180 in the supporting tubes 74 and 76 so that one end of the slot abuts the pin 184. The armrest supporting plate 176 is then moved to a central position on the sleeve where it fits snugly and is held in place by the spring 186. When the seat frames are retracted as shown in FIG. 3, the inner tubes 90 slide in the outer tubes 88 and the inner end web 78 and the collar 100, attached thereto, slide on the outer tubes 88 so as to move the supporting plate 176 of the armrest into abutment with the inner end of the seat frame 60 so as to move the sleeves 178 and 180 into the supporting tubes 66 and 68 and the slot 182 so that its other end is in abutment with the pin 184.

The outer armrests 36 and 38 are secured to the respective seat frames 60 and 62 and to supports 192 inwardly of outer plates 134. The supports 192 are secured to the end by conventional means as shown.

As shown in FIGS. 3-5, 7 and 8, extending downwardly from the outer ends of the seat frames are luggage restraining rails 200 which are telescoped at 202 so as to be extendible and retractable in accordance with the conversion of the seat frames to different fare classes. The seat frames 60 and 62, FIG. 7, have identical back frames 204 on which the back cushions are fitted. As shown, the back frames move with the seat frames when the seats are converted from one fare class to another. The frame backs are adjusted by devices 206.

Figure 12:
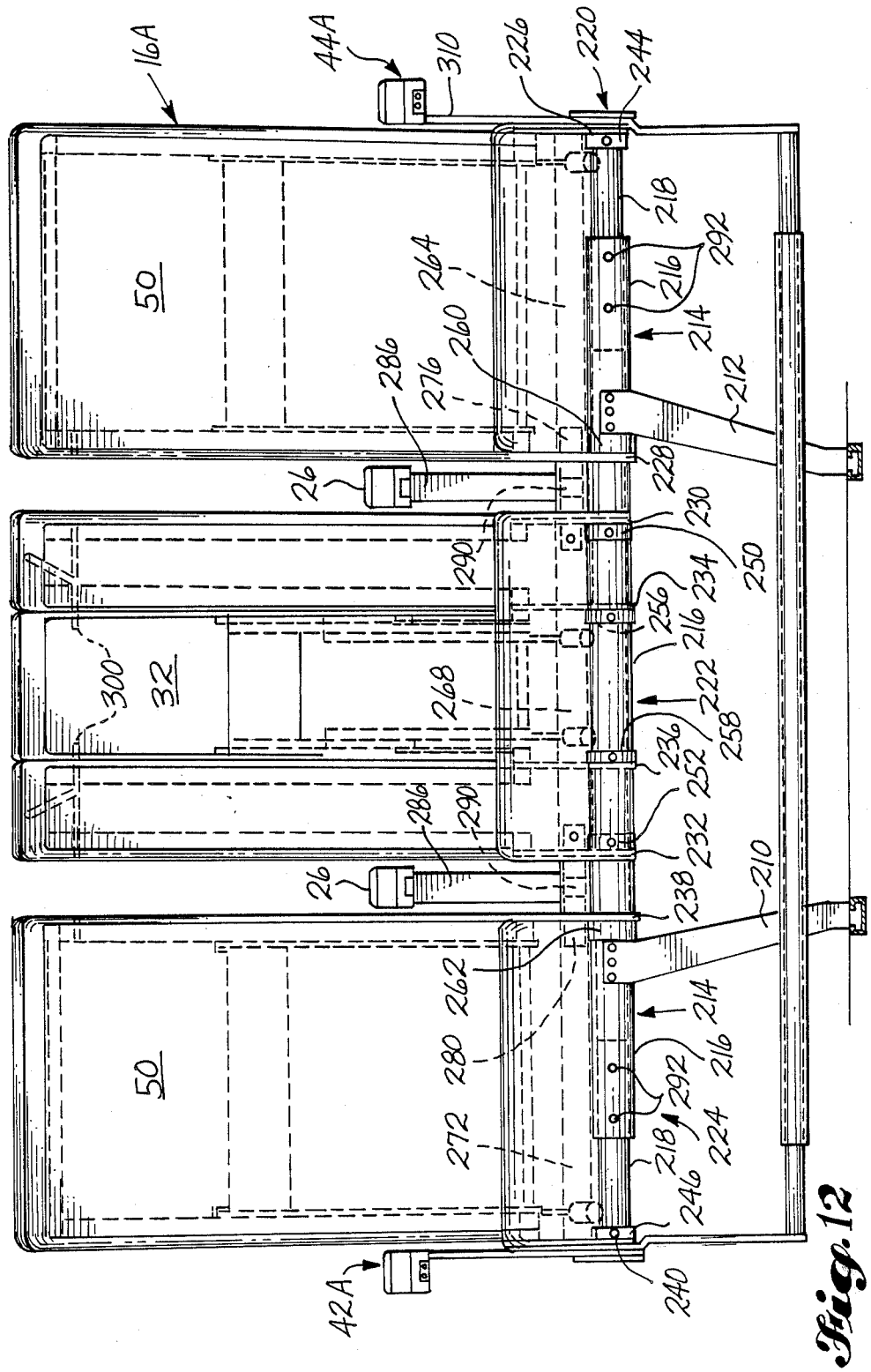
FIG. 12 is a front elevational view of a combination of three center seats and their seat frames in the tourist class arrangement.

The centered three-to-two seat combination is shown in FIGS. 12-19. The three seat tourist class arrangement is shown in FIGS. 12, 14 and partially in FIG. 16 wherein conversion has taken place in part, note the withdrawn handle 132. Two sets of seat frame legs 210 and 212 are fixed in place and are fixed in supporting engagement with a second set of seat frame tubes, generally designated as 214, and comprised of two outer large diameter tubes 216 having inner tubes 218 slidably engaged therein at the opposite outer ends of the outer tubes. The combination of second tubes 214 support three combined seat frames, generally designated as 220, 222 and 224. Frame 220 has an aisle web 226 and an inner web 228; frame 222 has outer webs 230 and 232 and two internal webs 234 and 236; and frame 224 has an internal end web 238 and an aisle web 240.

The two pairs of inner tubes 218 are fixed to aisle web 226 and collars thereon 244 and aisle web 240 and collars 246 thereon, respectively. The two outer tubes 216 are fixed to the outer webs 230 and 232 of inner frame 222 and to collars 250 and 252 attached thereto, respectively. The outer tubes are also fixed to internal webs 234 and 236 and to collars 256 and 258 attached thereto, respectively. The outer tubes 216, are slidably engaged in internal webs 228 and 238 and to collars 260 and 262 attached thereto, respectively. The latter collars add to the supporting arrangement of the slidable engagement of the tubes with the webs.

Extending between and secured to the end webs 226 and 228 are two horizontal tubular supporting members 264 and 266, FIG. 16. Horizontal support members 268 and 270 are secured to end webs 232 and 230 and extend through webs 234 and 236. Horizontal support members 272 and 274 extend between end webs 238 and 240 and are secured thereto. Secured within one end of supporting tubes 268 and 270 are a pair of armrest support sleeves 276. The support sleeves extend into supporting members 264 and 266 in which they are slidably engaged. At the other end of supporting members 268 and 270 are identical support sleeves 280, slidably engaged in supporting members 272 and 274. Center armrests 26, shown in FIGS. 12, 14, and 17, in the tourist class arrangement, are supported by posts 286 and 288, having plugs 290 which are removably engaged in sleeves 276, and 280.

The extension of locking mechanism 52 shown in FIGS. 10 and 11, as used in the combination of outside seat frames, is of the same type used in the center combination of three seat frames and operates in the same manner but has different dimensions as necessary for the different embodiments. In FIGS. 12 and 13, holes 292 adapted to receive the outer pins as 158 and 160, FIG. 10, are shown at both ends of the large diameter second tubes 216. In FIGS. 12 in the three seat arrangement, the seat frames are in the extended position, the inner tubes 218 extending substantially more outwardly than in FIG. 13. The seat webs 238 and 232 and the seat webs 230 and 228 are spaced whereas in FIG. 13 they have been moved closely together so that the outer seat cushions 48, which are the same as those in the two frame combination, are in contact with inner seat cushion 48. In FIG. 13 the inner armrests 26 have been removed and the sleeves 276 and 280 have been extended farther into the supporting tubes 264, 266 and 272, 274, respectively. The outer or aisle seat back frames 204, FIG. 16, are the same as those shown in FIG. 7 in the two seat frame combination. The center seat back frame 32A has a different configuration in that part folds downwardly and forms a center armrest 30, FIGS. 1, 13, 15, 16 and 18. As in the two seat combination, the seat back frames move with the seat frames.

As shown in FIGS. 12 and 13, at the upper end of the center seat there are horizontally movable pins 300. When the outer or aisle seats are moved inwardly to generally abut the inner seat, the pins 300 are moved in the seat back cushions 60 of the outer seats to adjoin the spaced elements 302 of the center seat back to the outer seat backs 50. As stated, to move the outer seat frames 220, 224 inwardly to form the business class double seats, the armrests 26 must be removed and stored. They may be stored in an arranged storage under the seat frames or in the backs thereof. As best seen in FIG. 18, the center armrest 30 for the business class seats is moved downwardly from the back on a hinge 304. The center seats also have mechanisms 206 for adjusting the seat backs.

To change the seats from one fare class to the other, the handles 132 may be pulled outwardly into the aisles 18A, 18B and 20A, 20B by members of the flight crew and the seat frames may be moved inwardly and outwardly to retract or extend as the case may be. This operation is made clear in FIGS. 10 and 11. It should be noted that when the outer seats 12A and 12B are extended from the positions, shown in FIG. 1 and FIG. 3, to the extended positions, shown in FIG. 2 and FIG. 4, aisle space 18B and 20B would tend to be reduced but when the inner seats 16A are moved to make two business class seats 16B, the position is changed from that shown in FIG. 12 to that shown in FIG. 13. This conversion from three seats to two seats tends to make the aisles 18B and 20B larger. To add additional space to the aisles, the armrests 42A and 44A, FIG. 19, have removable U-shaped caps 306 supported on a hinged plate 308, engaged with armrest support 310. When the caps 306 are removed, the hinge plate 308 may be lifted and moved inwardly so as to be rotated 180°. The result of this adjustment is illustrated in FIGS. 2 and 13 where the armrest 42B and 44B extend inwardly with the caps 306 having been placed on top of the adjusted hinge 308 extending inwardly over the seats. As stated, this results in increasing the aisles 18B and 20B by two inches and has a final result of making each of the aisles one inch smaller than 18A and 20A as shown in FIG. 1.

The invention and its attendant advantages will be understood from the foregoing description and it will be apparent that various changes may be made in form, construction, and arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims.

What is claimed is:

1. An aircraft passenger seat assembly convertible between two side-by-side seats and three side-by-side seats, comprising:

support leg structure for a seat cushion support frame;

a seat cushion support frame on said support structure, said seat cushion support frame having a fixed central portion secured to the support structure and opposite end portions movable in and out relative to the fixed central portion;

three side-by-side seat cushions on said seat cushion support frame, with the center cushion being on the fixed central portion of the frame and with the two outside seat cushions being on the movable end portions of the frame, whereby the end portions of the frame can be moved inwardly to move with them the outer seat cushions and place said outer seat cushions against the center seat cushion, so that the three seat cushions can define two side-by-side sitting areas, and with the outer frame portions being movable outwardly from the fixed center frame portion for the purpose of moving the outer seat cushions away from the center seat cushion, so that each of the three seat cushions can define a separate seating area.

2. Aircraft passenger seat frames having legs fixed in place, said seat frames being convertible to different fare class sizes, comprising:

a plurality of juxtaposed seat frames having legs fixed thereto;

each seat frame having generally horizontal supporting members having their opposite ends secured in seat frame end webs; and tubes associated with each of the seat end webs of the plurality of seat frames in a supporting relationship;

said legs being connected to said tubes to support said seat frames;

said tubes having a tube-in-tube slip joint at least at one outside end of one seat frame on which the one seat frame can be moved toward or away from an adjacent seat frame to change the fare class size of the seat frames;

each tube-in-tube slip joint having an inner small diameter tube and an outer large diameter tube; said inner and outer tubes being in slidable engagements;

each inner tube being in connective support with a seat end web at said one outside end of the one seat; and each outer tube being connected to said legs and in relative slidable supportive engagement through an inner web of said one seat frame opposite said outer web.

3. The invention according to claim 2 in which:

said inner web of said one seat frame has collars attached thereto within which said outer tubes are in slidable supportive engagement.

4. The invention according to claim 3 including:

a locking and releasing mechanism at said one end of said one seat frame to integrally lock and release said inner and outer tubes to each other.

5. Aircraft passenger seat frames having legs fixed in place, said seat frames being convertible to different fare class sizes, comprising:

a plurality of juxtaposed seat frames having legs fixed thereto;

each seat frame having generally horizontal supporting members having their opposite ends secured in seat frame end webs; and tubes associated with each of the seat end webs of the plurality of seat frames in a supporting relationship;

said legs being connected to said tubes to support said seat frames;

said tubes having a tube-in-tube slip joint at least at one outside end of one seat frame on which the one seat frame can be moved toward or away from an adjacent seat frame to change the fare class size of the seat frames;

each tube-in-tube slip joint having an inner small diameter tube and an outer large diameter tube;

said inner and outer tubes being in slidable engagement;

each inner tube being in connective support with a seat end web at said one outside end of the one seat;

each outer tube being in relative slidable supportive engagement in an inner web of said one seat frame opposite said outer web;

said inner web of said one seat frame having collars attached thereto and in which said outer tubes are in slidable supportive engagement;

a locking and releasing mechanism at said one end of said seat frame to lock and release said inner and outer tubes with respect to each other;

a translatable armrest being fitted between and for two of said juxtaposed seat frames;

said armrest being fitted on an upper end of a translatable plate and the lower end of said plate being fitted to sleeves slidably engaged in said supporting members of said two seat frames;

said armrest and plate being translatable to be closely adjacent to said seat frames when a seat frame has been moved toward a juxtaposed seat frame so as to be proximate thereto and said sleeves have been moved in said supporting members toward said juxtaposed seat frame;

said plate being translatable to be spaced between said two seat frames when a seat has been moved away from a juxtaposed seat frame and said sleeves have been moved in said supporting members away from said juxtaposed seat frame; and means in said supporting members to maintain said plate to be spaced between said seat frames.

6. The invention according to claim 2 in which:

each outer large diameter tube remains in a fixed relationship with said legs as said one seat frame is moved relative to said adjacent seat frame.

7. Aircraft passenger seat frames having legs fixed in place, said seat frames being convertible to different fare class sizes, comprising:

a plurality of juxtaposed seat frames having legs fixed thereto;

each seat frame having generally horizontal supporting members having their opposite ends secured in seat frame end webs;

tubes associated with each of the seat end webs of the plurality of seat frames in a supporting relationship;

said legs being connected to said tubes to support said seat frames;

said tubes having a tube-in-tube slip joint at least at one outside end of one seat frame on which the one seat frame can be moved toward or away from an adjacent seat frame to change the fare class size of the seat frames;

each tube-in-tube slip joint having an inner small diameter tube and an outer large diameter tube;

said inner and outer tubes being in slidable engagement;

each inner tube being in connective support with a seat end web at said one outside end of the one seat;

each outer tube being in relative slidable supportive engagement in an inner web of said one seat frame opposite said outer web;

each outer large diameter tube being in a fixed relationship with said legs;

said locking and releasing mechanism having an operating handle adjacent said one end of said one seat frame;

one end of an operating rod being connected to said handle and the other end of the rod being connected to rotary means and locking pins;

said rotary means being rotatable by linear movement of the rod when the handle is pulled outwardly of the one end of the seat frame to withdraw the locking pins from the tubes so as to release the inner and outer tubes from each other to permit the inner tubes to be slidable within the outer tubes; and said locking pins being movable to a locking position with respect to the inner and outer tubes when the handle is moved inwardly to its position adjacent said one end of said one seat frame.

8. Aircraft passenger seat frames being convertible to different fare class sizes, comprising:

a combination of three seat frames in a row having two sets of legs fixed thereto;

each seat frame having generally horizontal supporting member having their opposite ends secured in seat frame end webs;

tubes associated with each of the seat end webs of the three seats in a supporting relationship;

said legs being connected to said tubes to support said seat frames;

said tubes having tube-in-tube slip joints at outside ends of outside seat frames on which the outside seat frames can be moved inwardly from a three seat frame combination to a two seat frame combination and outwardly from the two seat frame combination to a three seat frame combination;

wherein each tube-in-tube slip joint has an inner small diameter tube and an outer large diameter tube;

said inner and outer tubes being in slidable engagements;

each inner tube being in connective support with a respective outside seat web at an outside end of the seat frame; and each outer tube being in relative slidable supportive engagement in inner end webs of the outside seat frames;

said outer tubes being fixed to the inside seat frame of the three seat frames and to said legs.

9. The invention according to claim 8 in which:

said inner webs of said outside seat frames have collars attached thereto and in which said outer tubes are in slidable supportive engagements.

10. The invention according to claim 9 including:

a locking and releasing mechanism at each outside end of said outside seat frames to lock and release said inner and outer tubes with respect to each other at said respective ends.

11. Aircraft passenger seat frames being convertible to different fare class sizes, comprising:

a combination of three seat frames in a row having two sets of legs fixed thereto;

each seat frame having generally horizontal supporting members having their opposite ends secured in seat frame end webs;

tubes associated with each of the seat end webs of the three seats in a supporting relationship;

said legs being connected to said tubes to support said seat frames;

said tubes having tube-in-tube slip joints at outside ends of outside seat frames on which the outside seat frames can be moved inwardly from a three-seat frame combination to a two-seat frame combination and outwardly from the two-seat frame combination to a three-seat frame combination;

each tube-in-tube slip joint having an inner small diameter tube and an outer large diameter tube; said inner and outer tubes being in slidable engagement;

each inner tube being in connective support with a respective outside seat web at an outside end of the seat frame;

each outer tube being in relative slidable supportive engagement in inner end webs of the outside seat frames;

said outer tubes being fixed to the inside seat frame of the three seat frames and to said legs;

said inner webs of said outside seat frames having collars attached thereto and in which outer tubes are in slidable supportive engagement;

said outer seat frames in the three seat combination are spaced from the inner seat frame in a smaller seat frame, lower fare arrangement;

inner armrests being positioned in the spaces between inner and outer seat frames;

inner armrest supports being fixed in the supporting members in the inner seat frame; said inner armrest supports extending from the inner seat frame into respective outer seat frame supporting members;

said inner armrest supports being in relative slidable and supported engagement in said outer seat supporting members; and said inner armrest supports between the seat frame having openings to receive pins attached to the inner armrests and to secure to the inner armrests positioned between the seat frames.

12. The invention according to claim 11 in which:

said inner armrests and pins are removable from said inner armrest supports to permit the three seat frame combination to be changed to a two seat frame combination;

said supporting members of said outside seats sliding on said inner armrest supports when said outer seat frames are moved inwardly to form the two seat frame combination;

said outer seat frames being closely adjacent said inner seat frame in the two seat combination.

13. The invention according to claim 12 in which:

an inner armrest is formed as a part of a back of the inner seat frame;

said inner seat frame armrest being centered in said back and hinged so as to be foldable downwardly to form a center armrest for the two seat frames in the two seat combination.

14. The invention according to claim 11 in which:

outer armrests are secured to supports on outer ends of the outer seat frames;

said outer armrests having upper caps upon which a passenger's arm may be positioned;

said caps being removable;

generally horizontal hinged plates on said supports on said outer ends forming flat supports for inner upper surfaces of said caps;

said plates being hingedly movable from outer flat positions to inner flat positions relative to said seat frames;

whereby when a three seat frame combination is changed to a two seat frame combination, the plates may be moved inwardly to receive the caps thereon to increase aisle space outwardly of the outer seat frames.

15. Aircraft passenger seat frames being convertible to different fare class sizes, comprising:

a combination of three seat frames in a row having two sets of legs fixed thereto;

each seat frame having generally horizontal supporting members having their opposite ends secured in seat frame end webs;

tubes associated with each of the seat end webs of the three seats in a supporting relationship;

said legs being connected to said tubes to support said seat frames;

said tubes having tube-in-tube slip joints at outside ends of outside seat frames on which the outside seat frames can be moved inwardly from a three-seat frame combination to a two-seat frame combination and outwardly from the two-seat frame combination to a three-seta frame combination;

each tube-in-tube slip joint having an inner small diameter tube and an outer large diameter tube; said inner and outer tubes being in slidable engagement;

each inner tube in connective support with a respective outside seat web at an outside end of the seat frame;

each outer tube being in relative slidable supportive engagement in inner end webs of the outside seat frames;

said outer tubes being fixed to the inside seat frame of the three seat frames and to said legs;

said inner webs of said outside seat frames having collars attached thereto and in which outer tubes are in slidable supportive engagement;

a locking and releasing mechanism at each outside end of said outside seat frames to lock and release said inner and outer tubes with respect to each other at said respective ends;

each locking and releasing mechanism having an operating handle adjacent each outside end of a respective outside seat frame;

one end of an operating rod being connected to each respective handle and the other end of the rod being connected to rotary means and locking pins in each respective mechanism;

said rotary means being rotatable by linear movement of the rod when the handle is pulled outwardly of a respective outer end of an outer seat frame to withdraw the locking pins from the tubes so as to release the inner and outer tubes from each other to permit the inner tubes to be slidable within the outer tubes and said locking pins being movable to a locking position with respect to the inner and outer tubes when the handle is moved inwardly to its position adjacent an outer end of an outer seat frame.

16. In an aircraft, rows of passenger seats frames convertible in place to different fare class sizes, comprising:

each row having a pair of combined outside seat frames extending inwardly from two opposite aircraft sidewalls and having a combination of three centered seat frames with respect to the sidewalls and outside seat frames;

an aisle space between each pair of outside seat frames and the center seat frames;

each of the three combinations of seat frames having two sets of legs fixed in place in the aircraft;

each seat frame having generally horizontal supporting members having their opposite ends secured in seat frame end webs;

first tubes associated with each of the seat end webs in the respective combinations of outside seats in supporting relationships;

second tubes associated with each of the seat end webs of the three center seat frames in a supporting relationship;

each of the two sets of legs of each combination of seat frames being connected to the respective tubes of each combination; and said first tubes in the outside seat frames having a tube-in-tube slip joint in the aisle ends of the aisle seat frame in which the aisle seat frame can be moved toward or away from the other seat frame of the combination to change the fare class size of the outside seat frames, said second tubes in the center seat frames having tube-in-tube slip joints at aisle ends of the two aisle seat frames on which the aisle seats can be moved inwardly from a three seat frame combination to a two seat frame combination and outwardly from the two seat frame combination to a three seat frame combination.

17. The invention according to claim 16 in which:

each tube-in-tube slip joint of the first and second tubes has an inner small diameter tube and an outer large diameter tube; said inner and outer tubes being in slidable engagements;

each inner tube of the second tubes being in connective support with a respective aisle seat frame web at an aisle end of the seat frame; and each outer tube of the second tubes being in relative slidable supportive engagement in inner end webs of the aisle seat frames;

said outer tubes of the second tubes being fixed to the webs of the inside seat of the three seat frame combination and to the legs thereof; and each inner tube of the first tubes being in connective support with a respective aisle seat web at an aisle end of the aisle seat frame;

each outer tube of the first tubes being in relative slidable supportive engagement in a respective inner web opposite such aisle end web of the aisle seat frames; and each outer tube of said first tubes being in a fixed relationship with said legs of the combinations of outside seat frames and the webs of the other seat frame of the outside seat frames.

18. The invention according to claim 17 in which:

each inner web of said aisle seat frames of said outside seat frames has collars attached thereto and in which said outer tubes of the first tubes are in slidable supportive engagements; and each inner web of said aisle seat frames of the center combination has collars attached thereto and in which said outer tubes of the second tubes are in slidable supportive engagements.

19. The invention according to claim 18 including:

a locking and releasing mechanism at each aisle end of each aisle seat frame to lock and release respective inner and outer tubes with respect to each other.

20. The invention according to claim 19 in which:

each locking and releasing mechanism having an operating handle adjacent each aisle end of each aisle seat frame;

one end of an operating rod in each mechanism being connected to a respective handle and the other end of each rod being connected to rotary means and locking pins;

said rotary means in each mechanism being rotatable by linear movement of the rod when the handle is pulled outwardly into an aisle to withdraw the locking pins from the respective tubes so as to release the respective inner and outer tubes from each other to permit the inner tubes to be slidable within the outer tubes;

said locking pins being movable to a locking position with respect to inner and outer tubes when the handle is moved inwardly to its position adjacent the aisle end of the seat frames.

21. The invention according to claim 17 including:

a translatable armrest fitted between each pair of outside seat frames;

each armrest being fitted on an upper end of a translatable plate and the lower end of said plate being fitted to sleeves slidably engaged in said supporting members in the outside seat frames;

said armrests and plates being translatable to be closely adjacent the seat frames of each pair of outside seat frames when the aisle seat frames have been moved toward the other seat frames of the pairs so as to be proximate thereto and said sleeves of each pair have been moves in said supporting members toward the other seat frames of the pairs;

said plates being translatable to be spaced between said pairs of outside seat frames when the aisle seat frames have been moved away from the other outside seat frames and said sleeves have been moved in said supporting members away from the other outside seat frames; and means in said supporting members to maintain the plates to be spaced between the outside seats.

22. The invention according to claim 17 in which:

said aisle seat frames of the centered three seat frame combination are spaced from the inner seat frame of the combination in a smaller seat frame, lower fare arrangement;

inner armrests being positioned in the spaces between the inner and aisle seat frames;

inner armrest supports being fixed in the supporting members in the inner seat frame; said inner armrest supports extending from the inner seat into respective aisle seat frame supporting members;

said inner armrest supports being in relative slidable and supported engagement in said aisle seat frame supporting members;

said inner armrest supports between the aisle seat frames and inner seat frame having openings to receive pins attached to the inner armrests and to secure the inner armrests positioned between the seat frames.

23. The invention according to claim 22 in which:

said inner armrests and pins are removable from said inner armrest supports to permit the three seat frame combination to be changed to a two seat frame combination;

said supporting members of said aisle seat frames sliding on said inner armrest supports when said outer seat frames are moved inwardly to form the two seat frame combination;

said aisle seat frames being closely adjacent said inner seat frame in the two seat frame combination.

24. The invention according to claim 23 in which:

an inner seat frame armrest is formed as a part of a back of the inner seat frame;

said inner seat frame armrest being centered in said back and hinged so as to be foldable downwardly to form a center armrest for the two seat frame combination.

25. The invention according to claim 22 in which:

outer armrests on the aisle seat frames are secured to supports on aisle ends of the aisle seat frames;

said outer armrests having upper caps upon which a passenger's arm may be positioned;

said caps being removable;

generally horizontal hinged plates on said supports on said aisle ends forming flat supports for inner upper surfaces of said caps;

said plates being hingedly movable from outer flat positions to inner flat positions relative to said seats;

whereby when a three seat frame combination is changed to a two seat frame combination, the plates may be moved inwardly to receive the caps thereon to increase aisle space outwardly of the aisle seats.

* * * * *

UNITED STATES PATENT AND TRADEMARK OFFICE
CERTIFICATE OF CORRECTION

PATENT NO. : 4,881,702

DATED : November 21, 1989

INVENTOR(S) : Richard J. Slettebak

It is certified that error appears in the above-identified patent and that said Letters Patent is hereby corrected as shown below:

In the Abstract, third line from the bottom, delete "the", first occurrence.

Col. 2, line 16, after "frame", insert -- so --.

Col. 2, line 48, "intended" should be -- intending --.

Col. 5, line 1, "1126" should be -- 116 --.

Col. 6, line 21, after "end", insert -- webs --.

Col. 6, line 36, "wherein" should be -- where --.

Col. 7, line 10, "of" should be -- and --.

Col. 7, line 18, "Figs." should be -- Fig. --.

Col. 7, line 39, "in" should be -- into --.

Col. 7, line 40, "60" should be -- 50 --.

Claim 8, col. 10, line 53, "member" should be -- members --.

Claim 13, col. 12, line 10, insert -- seat -- after "inner".

Claim 15, col. 12, line 49, "three-seta" should be -- three-seat --.

Claim 15, col. 12, line 54, insert -- being -- after "tube".

Claim 15, col. 13, line 15, "tubes and" should be -- tubes; and --.

UNITED STATES PATENT AND TRADEMARK OFFICE
CERTIFICATE OF CORRECTION

PATENT NO. : 4,881,702

DATED : November 21, 1989

INVENTOR(S) : Richard J. Slettebak

It is certified that error appears in the above-identified patent and that said Letters Patent is hereby corrected as shown below:

Claim 16, col. 13, line 19, "seats" should be -- seat --.

Claim 21, col. 14, line 61, "moves" should be -- moved --.

Signed and Sealed this

Eighteenth Day of June, 1991

*Attest:*

HARRY F. MANBECK, JR.

*Attesting Officer*  *Commissioner of Patents and Trademarks*